(12) United States Patent
Bardroff et al.

(10) Patent No.: US 7,899,291 B2
(45) Date of Patent: Mar. 1, 2011

(54) OPTICAL FIBER WITH WATER-BLOCKING

(75) Inventors: Daniel Bardroff, Augsburg (DE); Stefan Jost, Augsburg (DE); Georg Koebler, Grossaitingen (DE); Jason Pedder, Chepstow (GB); Karl Uhl, Bobingen (DE); Peter A. Weimann, Atlanta, GA (US)

(73) Assignee: OFS Fitel, LLC, Norcross, GA (US)

( * ) Notice: Subject to any disclaimer, the term of this patent is extended or adjusted under 35 U.S.C. 154(b) by 0 days.

(21) Appl. No.: 12/424,965

(22) Filed: Apr. 16, 2009

(65) Prior Publication Data

US 2010/0080521 A1 Apr. 1, 2010

Related U.S. Application Data

(60) Provisional application No. 61/100,538, filed on Sep. 26, 2008.

(51) Int. Cl.
*G02B 6/44* (2006.01)
(52) U.S. Cl. .................. 385/100; 385/105; 385/114; 427/163.2; 427/508; 427/512
(58) Field of Classification Search .......... 385/100–114
See application file for complete search history.

(56) References Cited

U.S. PATENT DOCUMENTS

| 4,867,526 | A | | 9/1989 | Arroyo |
| 5,684,904 | A | * | 11/1997 | Bringuier et al. ............. 385/109 |
| 6,103,317 | A | * | 8/2000 | Asai et al. .................... 427/512 |
| 6,290,887 | B1 | | 9/2001 | Sheu et al. |
| 6,418,259 | B2 | * | 7/2002 | MC Nutt et al. ............. 385/128 |
| 2003/0178222 | A1 | * | 9/2003 | Moore et al. ............ 174/120 R |

* cited by examiner

*Primary Examiner*—Hemang Sanghavi
(74) *Attorney, Agent, or Firm*—Koji Noguchi, Patent Agent; Michael A. Morra, Esq.

(57) ABSTRACT

Polymer-coated transmission media having water-blocking material embedded in the outer surface of the transmission media prevents water penetration into the transmission media and reduces the overall diameter of a cable made from the transmission media by eliminating a water-blocking tape layer in the cable. The outer surface of the transmission media is a polymer whose outer surface is embedded with a water-blocking material. The water-blocking material is applied before the polymer is cured. The transmission media may be any known type of optical media, which guides a light within the optical media. In various embodiments, optical fibers, buffered optical fibers and fiber ribbons are used as the transmission media.

9 Claims, 8 Drawing Sheets

PRIOR ART

Figure 13

OPTICAL FIBER WITH WATER-BLOCKING

CROSS REFERENCE TO RELATED APPLICATIONS

This application claims the benefit of U.S. provisional patent application Ser. No. 61/100,538, filed Sep. 26, 2008, having the title "Optical Fiber With Water-Blocking," which is incorporated herein by reference in its entirety.

TECHNICAL FIELD

The present invention relates to optical fibers, and more particularly to water resistance of optical fibers and optical fiber cables.

BACKGROUND OF THE INVENTION

In telecommunication networks, one of the critical parts is a connecting unit between the two end points of sub-sections of the networks, for example from an outdoor distribution node to the entrance of an office building or multi-dwelling residence. To connect such end points, optical fiber cables are often being used as connecting units. To ensure functionality and reliability of the networks, those optical fiber cables have to protect transmission media (e.g. optical fibers) inside of the optical fiber cables from stresses and the surrounding environment.

Those optical fiber cables are often placed in outside plant environments, and also at the intersection of outside plant and inside plant environments. In such environments, protecting transmission media from water is especially important. If water penetration at such connecting units and/or optical fiber cables is allowed, it may create various problems. First, longitudinal water penetration along the unit into premises and/or equipment locations could cause damage to components located close to each end of the unit. Second, if water is allowed to migrate alongside or remain in contact with a unit, it may diffuse towards the transmission media. If water is allowed to come into contact with the glass transmission media, then it may have a detrimental effect upon lifetime and/or transmission performance of the transmission media. The detail of how the presence of water on the surface of the glass cause mechanical degradation and reduce lifetime is shown in publications such as T. A. Michalske and S. W. Freiman, "A Molecular Mechanism for Stress Corrosion in Vitreous Silica", J. Am. Ceram. Soc. 66 [4] 284-288 (1983).

To protect transmission media from water, optical fiber cables tend to be covered with extra layers of protection around the transmission media. However, because network duct areas are limited in most of the applications, there is a constant incentive to reduce the overall diameter of individual units and cable components, including optical fiber cables.

Accordingly, it is desirable to overcome the problems presented above.

SUMMARY OF THE INVENTION

The present invention provides transmission media in which water-blocking material is embedded in the outer surface of the transmission media to prevent water penetration into the transmission media and to reduce the overall diameter of an optical fiber cable having the transmission media by removing the traditional water-blocking tape layer of the cable.

To solve the issues addressed above, one of the methods disclosed in the present invention is a method for embedding water-blocking material in the outer surface of a transmission media comprising the steps of covering the transmission media with an uncured polymer, applying the water-blocking material to the outer surface of the polymer, and curing the coated transmission media.

As an embodiment of the present invention, an apparatus comprising transmission media, and a polymer around the transmission media wherein water-blocking material is embedded in the outer surface of the polymer is disclosed.

As another embodiment of the present invention, an apparatus for embedding water-blocking material in the outer surface of an optical fiber comprising a device applying the water-blocking material onto the outer surface of the transmission media, wherein the transmission media is covered by an uncured polymer is disclosed.

BRIEF DESCRIPTION OF THE DRAWINGS

Referring now to the drawings, please note that all the figures are not drawn to scale.

DETAILED DESCRIPTION

Reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications and equivalents. Also, elements sited in the drawings are not necessarily drawn in scale.

As discussed above, optical fiber cables are often used as a connecting unit between two points of sub-sections in a telecommunication network. Such optical fiber cables are placed in outside plant environments, and also in the intersection of outside plant and inside plant environments. In such environments, protecting transmission media in the cable from water is especially important. Issues of water penetration in such connecting units and optical fiber cables include: 1) longitudinal water penetration along the unit into premises and/or equipment locations, and 2) water diffusion towards the transmission media. Also for the optical fiber cables used in the telecommunication network, there is a constant incentive to reduce the overall diameter of individual units and cable components.

In recent years, one of the main drivers for reducing the size of optical units and cable components is called "microducts". In the microducts, optical fiber cables are installed underground and/or within a network of extremely small plastic tubes, either by pulling, pushing, or air-blowing units into the ducts. Use of the microduct and associated installation techniques generally results in minimal disruption of infrastructure during installation, and is especially advantageous in environments with older, built-up infrastructure, such as city centers.

Figure 13:
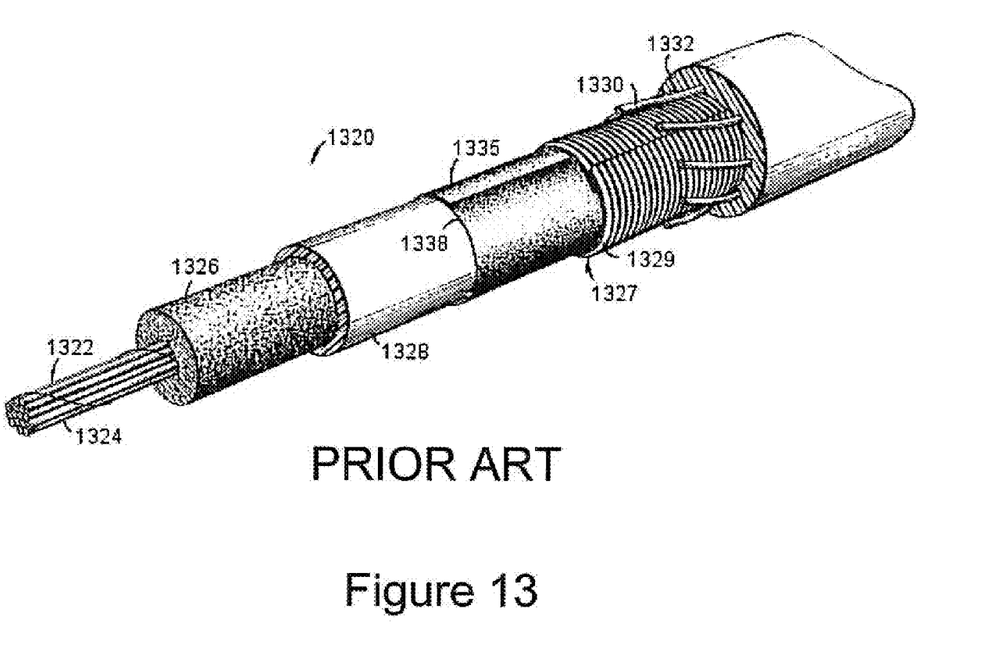
FIG. 13 is a conventional optical fiber cable with a water blocking tape.

In U.S. Pat. No. 4,867,526, a water-blocking tape is interposed between a core of an optical fiber cable and a plastic jacket. As shown in FIG. 13, a communication cable 1320 includes a core 1322 comprising at lease one optical fiber 1324 and being filled with filling material 1326. The core 1322 is enclosed by a sheath system 1327 which includes a core tube 1328, a corrugated metal shield 1329, at least one layer of strength member 1330 and an outer jacket 1332. Between the shield 1329 and the core tube 1328, a water-blocking tape 1335 is placed. The water-blocking tape 1335 comprises a substrate tape 1338 which is made of a hydrophilic material and which has been treated with a water-blocking material.

As described above, to protect transmission media from water, optical fiber cables tend to be covered with extra layers of protection (such as the water-blocking tape 1335) around the transmission media (e.g. optical fibers). However, because network duct areas are limited in most of the applications, there is a constant incentive to reduce the overall diameter of individual units and cable components, including optical fiber cables.

Figure 1:
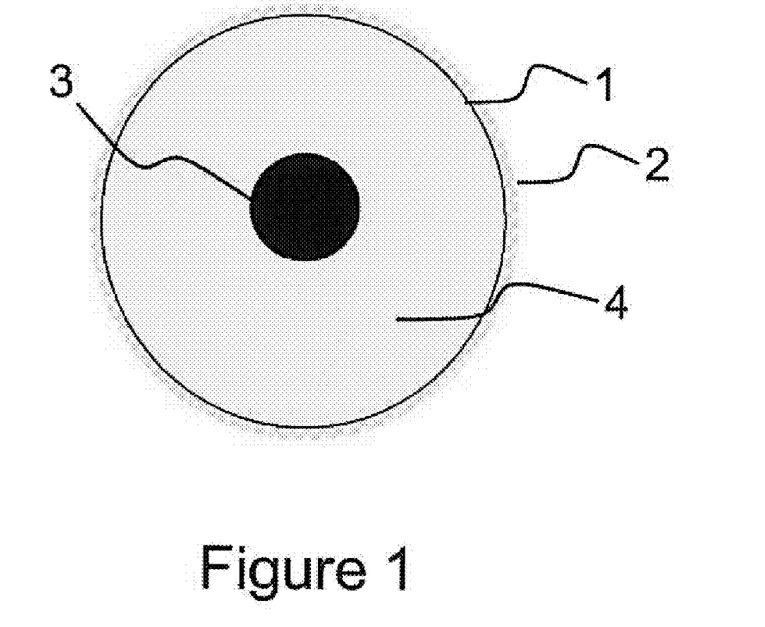
FIG. 1 is a cross-section view of an embodiment of the present invention, wherein an optical fiber is used as a transmission media.

FIG. 1 shows an embodiment of the present invention. An optical fiber 3 used as transmission media is covered by polymer 4. Water-blocking material 2 is embedded in the outer surface 1 of the polymer 4.

One of the advantages in the embodiment of the present invention is to reduce the overall diameter of an end product (e.g. an optical fiber cable) by removing a film (or tape) usually present in the end product to prevent water penetration into the optical fibers within the transmission media. Instead of the film, in the embodiment of the present invention, the water-blocking material is applied onto the polymer, which typically exists in the end product (i.e. no extra layer is added).

As used herein, the term "transmission media" refers to any known type of optical media, which guides light within the optical media. For examples, optical fibers, buffered optical fibers and fiber ribbons are used as transmission media in the embodiments of the present invention disclosed in this application.

The term "water-blocking material" is superabsorbent material, which are polymers that can absorb and retain extremely large amounts of a liquid relative to its own mass. As for the polymer described in the embodiments of the present invention, any polymer suitable for covering the at least one optical fiber may be used. Preferably, an acrylate resin is used as the polymer.

Figure 2:
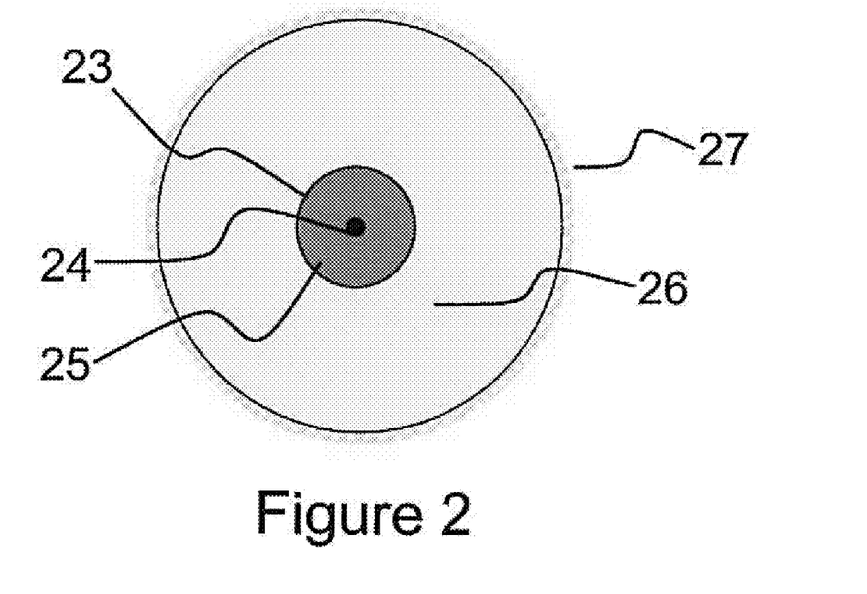
FIG. 2 is a cross-section view of another embodiment of the present invention wherein a buffered optical fiber is used as the transmission media.

In another embodiment of the present invention, at least one buffered optical fiber is placed within the transmission media. FIG. 2 shows a buffered optical fiber 23 covered by a polymer 26. In the same way as in FIG. 1, a water-blocking material 27 is embedded into the polymer 26. In the embodiment, the buffered optical fiber 23 is used as the transmission media.

The buffered optical fiber 23 comprises an optical fiber 24 and a buffer coating 25. The buffer coating 25 provides a layer that reduces bending and provides environmental protection for optical fiber 24.

Figure 3:
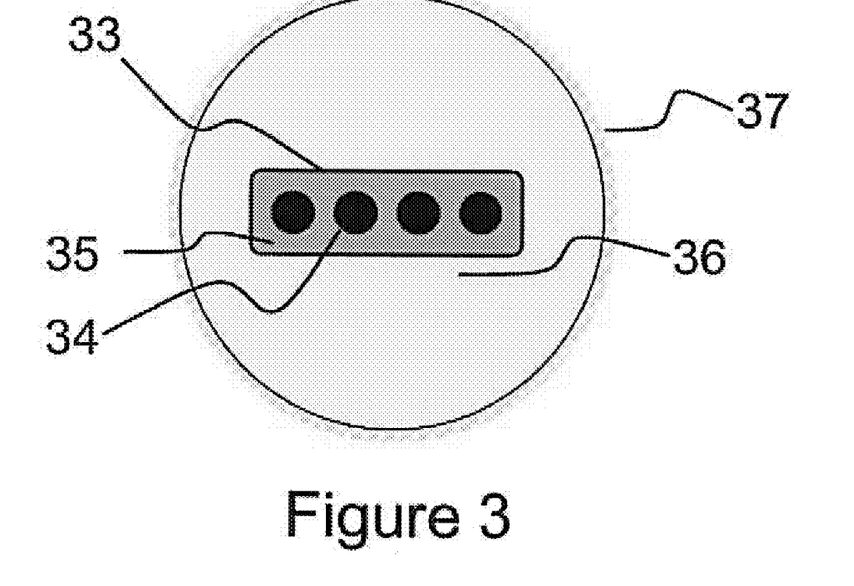
FIG. 3 is a cross-section view of yet another embodiment of the present invention wherein a fiber ribbon is used as the transmission media.

In yet another embodiment of the present invention, at least one fiber ribbon is placed within the transmission media. FIG. 3 shows a fiber ribbon 33 covered by a polymer 36. In the same way as in FIGS. 1 and 2, a water-blocking material 37 is embedded into the polymer 36. In the embodiment, the fiber ribbon 33 is used as the transmission media. The fiber ribbon 33 comprises one or more optical fibers 34 and each of the optical fibers 34 is jointed together with a buffer coating 35 in a linear array.

Those transmission media disclosed in the embodiments above (i.e. optical fibers, buffered optical fibers, and fiber ribbons) and any equivalents thereof can also be placed into a slotted core. In one of the embodiments of the present invention, optical fibers 43, which are coated with a polymer 44 and embedded with water-blocking material 42, are placed into slots in a slotted core 41 as shown in FIG. 4.

Figure 4:
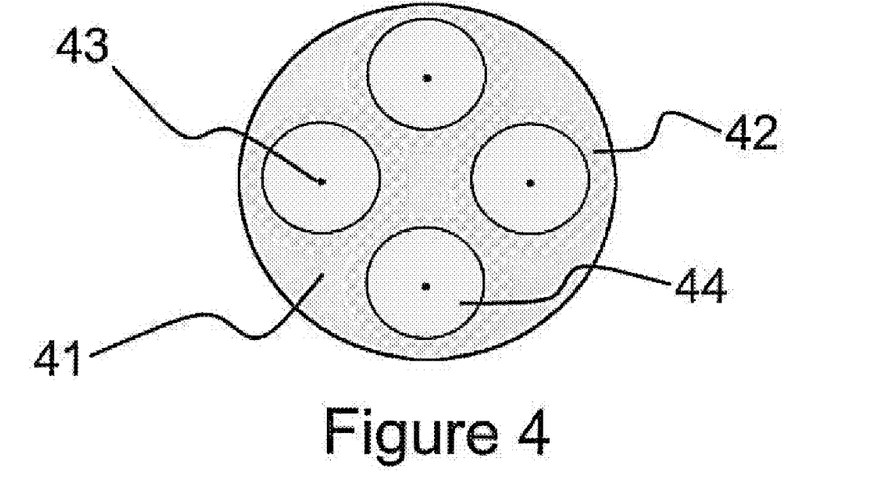
FIG. 4 is a cross-section view of an embodiment of the present invention wherein a slotted core is used to hold the optical fibers together.
Figure 5:
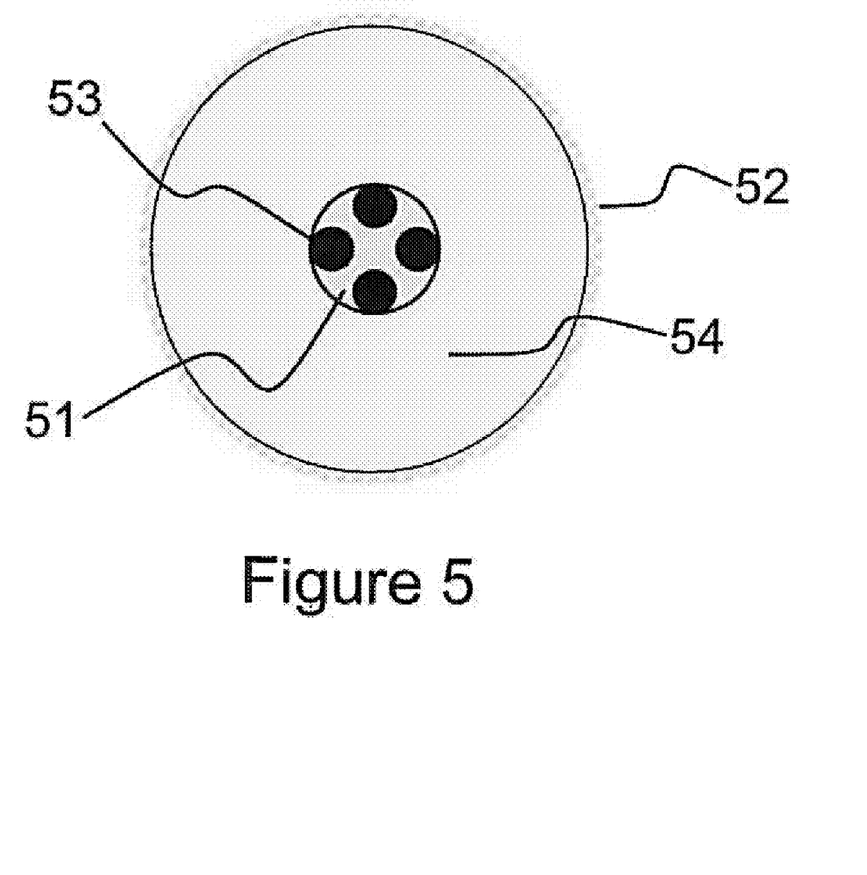
FIG. 5 is a cross-section view of another embodiment of the present invention wherein a slotted core is used to hold the optical fibers together.

Instead of providing water-blocking material in each individual fiber as shown in FIG. 4, water blocking material can be applied to those transmission media, which are placed in the slotted core, as a whole. In another embodiment of the present invention, optical fibers 53 placed into slots in a slotted core 51 are covered together with a polymer 54 and embedded with water-blocking material 52 as shown in FIG. 5.

Figure 6:
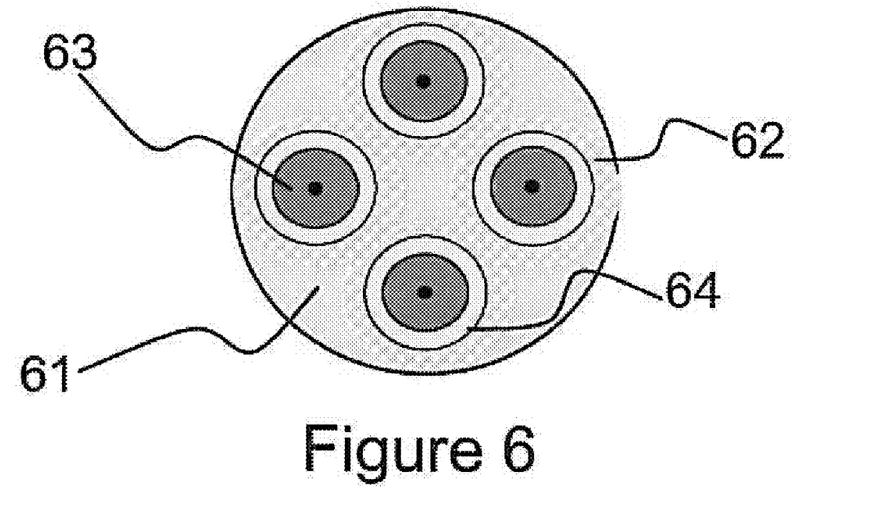
FIG. 6 is a cross-section view of an embodiment of the present invention wherein a slotted core is used to hold the buffered optical fibers together.
Figure 7:
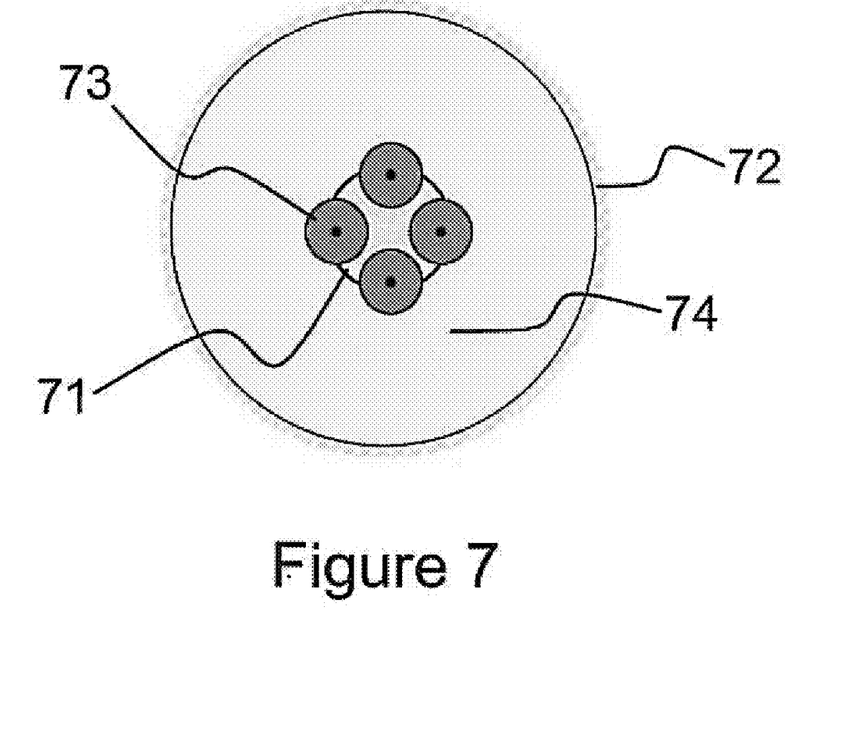
FIG. 7 is a cross-section view of another embodiment of the present invention wherein a slotted core is used to hold the buffered optical fibers together.

Those configurations also applied to the buffered optical fibers and fiber ribbon settings. In one embodiment of the present invention, buffered optical fibers 63, which are coated with a polymer 64 and embedded with water-blocking material 62, are placed into slots in a slotted core 61 as shown in FIG. 6. In yet another embodiment of the present invention, buffered optical fibers 73 placed into slots in a slotted core 71 are covered together with a polymer 74 and embedded with water-blocking material 72 as shown in FIG. 7.

Figure 8:
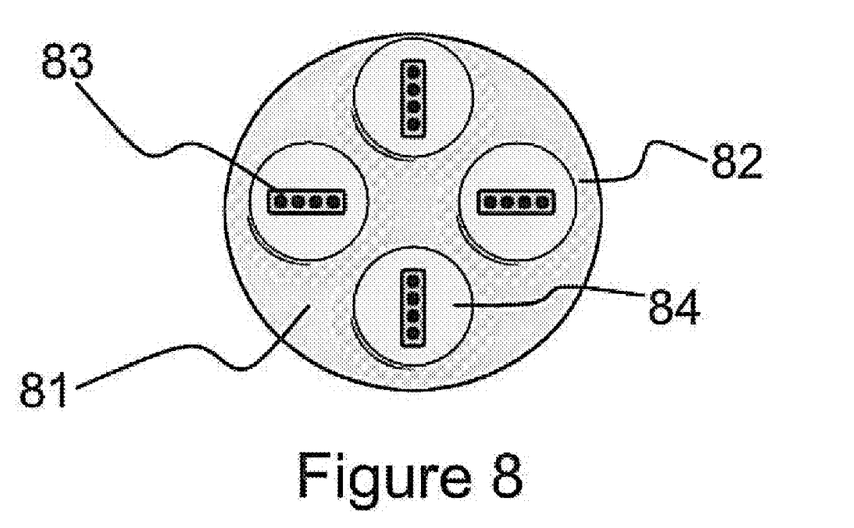
FIG. 8 is a cross-section view of an embodiment of the present invention wherein a slotted core is used to hold the fiber ribbons together.
Figure 9:
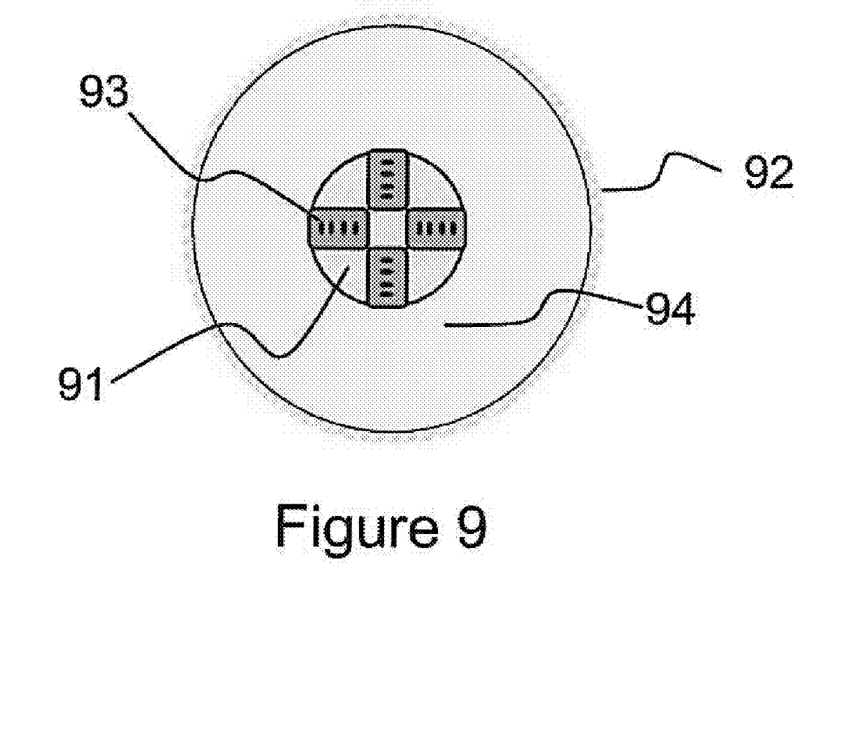
FIG. 9 is a cross-section view of another embodiment of the present invention wherein a slotted core is used to hold the fiber ribbons together.

In an embodiment of the present invention, the fiber ribbons 83, which are coated with a polymer 84 and embedded with water-blocking material 82, are placed into slots in a slotted core 81 as shown in FIG. 8. In another embodiment of the present invention, the optical fiber ribbons 93 placed into slots in a slotted core 91 are covered together with a polymer 94 and embedded with water-blocking material 92 as shown in FIG. 9.

Figure 10:
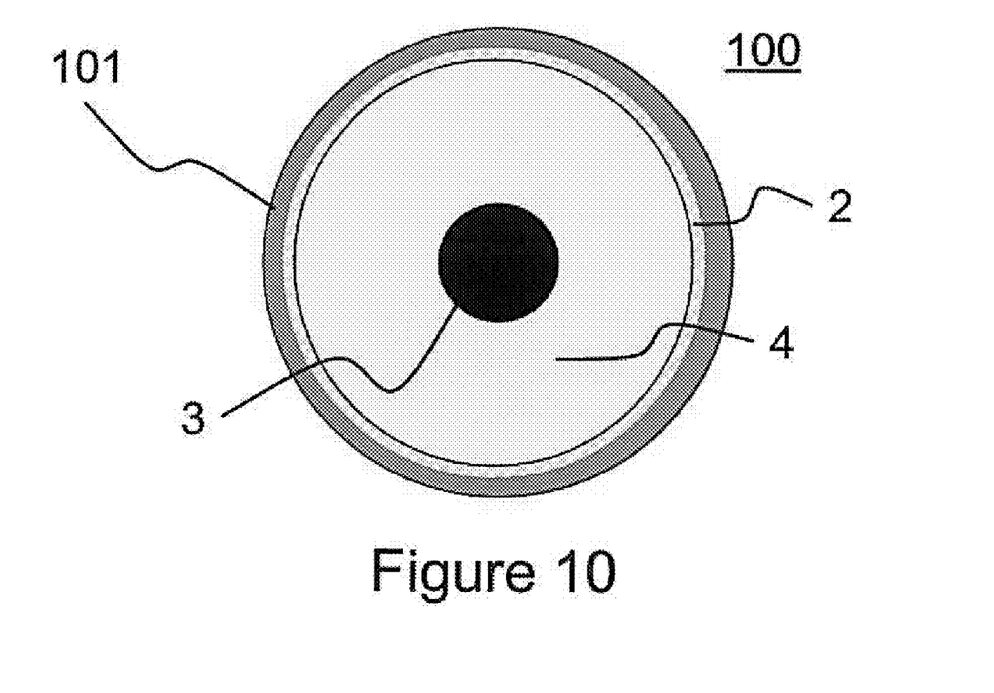
FIG. 10 is a cross-section view of an embodiment of the present invention wherein a sheath is added to form an optical fiber cable.

The embodiments of the present invention described above and the equivalents thereof may further include a sheath around the outer surface of the polymer to form an optical fiber cable. As an embodiment of the present invention, FIG. 10 shows an optical fiber cable 100, which comprises an optical fiber 3 as transmission media, a polymer 4 around the optical fiber 3 wherein water-blocking material 2 is embedded in the outer surface of the polymer 4, and a sheath 101 around the outer surface of the polymer 4. Instead of the optical fiber 3, buffered optical fibers and/or fiber ribbon can also be used as the transmission media. Single or multiple of those transmission media can be used as the transmission media.

Figure 10A:
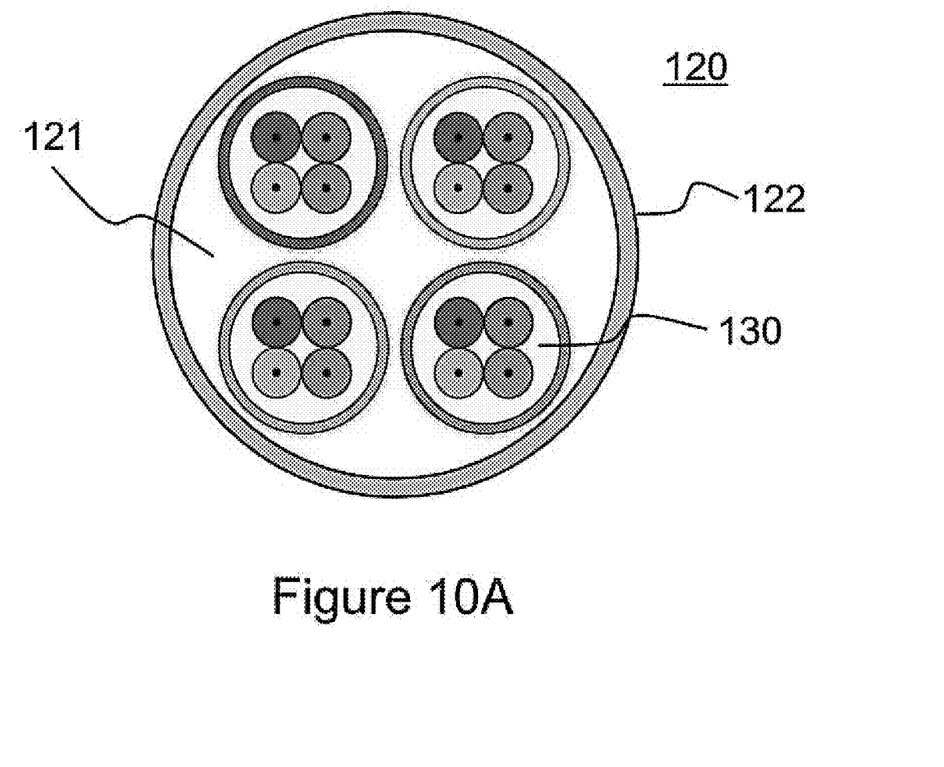
FIG. 10A is a cross-section view of an embodiment of the present invention wherein multiple of sub-units are placed inside of the optical fiber cable.
Figure 10B:
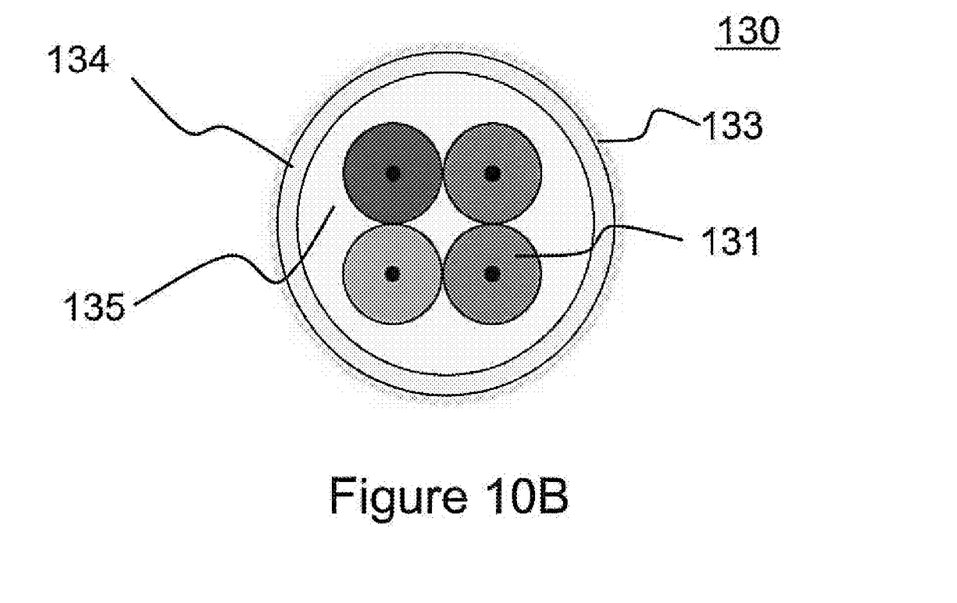
FIG. 10B is a cross-section view of the sub-unit.

Another embodiment may contain multiple subunits, each comprising of polymer embedded with water-blocking material around transmission media. For example, FIG. 10A shows an optical fiber cable 120 with four subunits 130. As shown in FIG. 10B, each of the subunit 130 has polymer embedded with water-blocking material 133 around buffered optical fibers 131. The polymer can be a single layer of polymer. However, two separate layers of polymer, a first polymer layer 135 and a second polymer layer 134, is preferable. Space 121 among the four subunits 130 in FIG. 10A can be filled with any suitable material such as a polymer. In addition, ripcords and/or tensile members (e.g. yarns, rigid rods) may be added in the space 121 as desired. Furthermore, the optical fiber cable 120 in FIG. 10A includes a sheath 122 around the space 121.

The sheath of the optical fiber cable is used to protect the transmission media (e.g. optical fibers, buffered optical fibers, fiber ribbons) inside the cable from the outside environment and any potential bending. The sheath typically includes one or more plastic jackets, strength members and a metallic shield. However, the components of the sheath may vary depends on number of factors such as the type of fibers in the cable, the application of the cable, and the environment surrounding the cable at the installation location. For example, if the sheathed cable is to be installed by air-blowing, a nylon 12 jacket may be selected to as to provide low friction. If the sheathed cable is to be installed within a building, a flame-retardant poly(vinyl chloride) or low-smoke zero halogen jacket may be selected to provide resistance to fire and compliance with fire codes.

As for the water-blocking material in the embodiment above, any form of water-blocking material suitable for preventing water penetration into the transmission media may be used. Preferably, a powder form of the water-blocking material can be used to preventing water penetration into the optical fibers.

Figure 11:
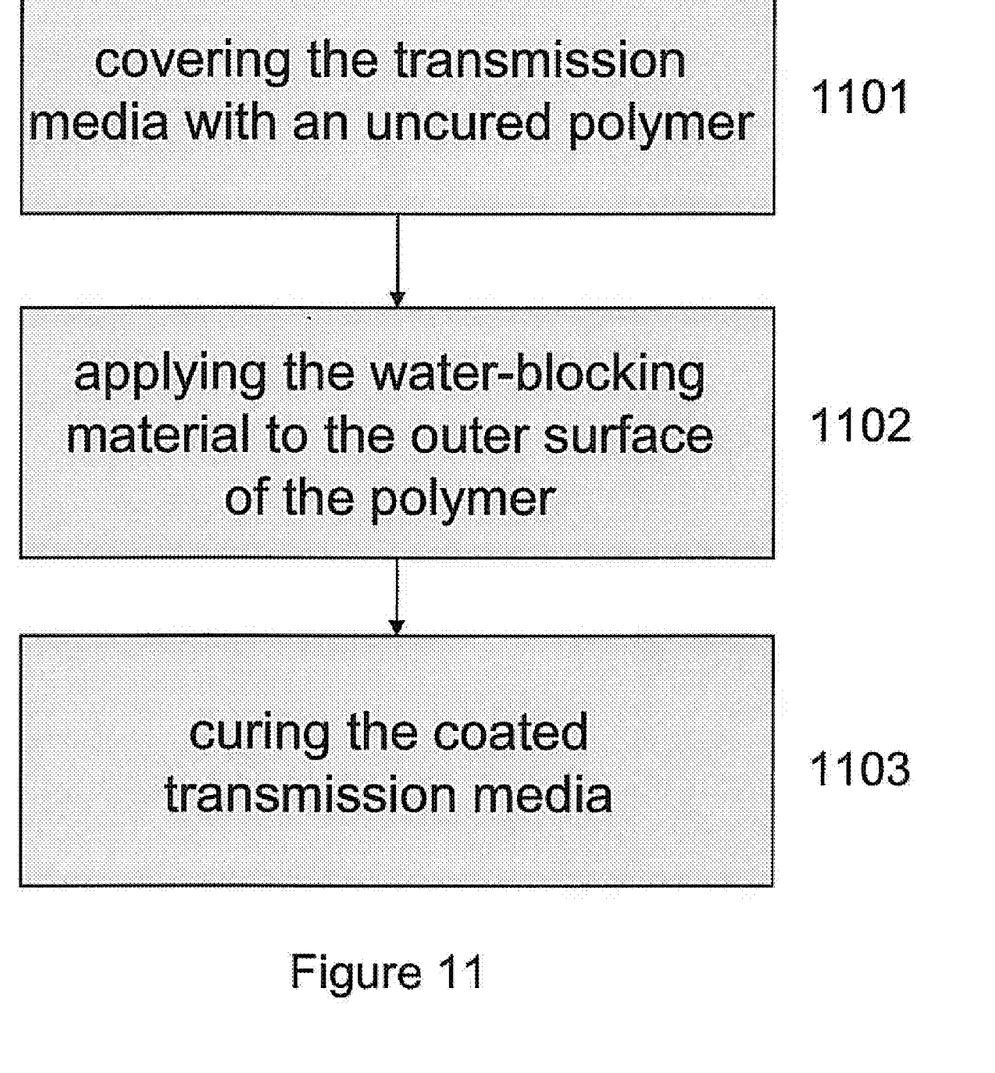
FIG. 11 is a flow chart of a manufacturing method according to the present invention.

One of the methods to embed water-blocking material in the outer surface of a transmission media in accordance with an embodiment of the present invention is described with reference to a flowchart of FIG. 11. According to the flow chart, the method begins with covering the transmission media with an uncured polymer in step 1101. Covering the transmission media with the uncured polymer can be done by using any suitable means. For example, the uncured polymer can be applied by using a spray or a die.

The transmission media to be covered by the uncured polymer in the step 1101 can be any known type of optical media which guides a light within the optical media. For example, in the above embodiments, optical fibers, buffered optical fibers and fiber ribbon are used as transmission media. Also, the transmission media is not limited to single line of optical media and can be more than one optical fiber, buffered optical fiber or fiber ribbon. If multiples of the optical fibers, the buffered optical fibers or the fiber ribbons are used as the transmission media, a polymer such as acrylate resin can be used to hold such multiple transmission media into a single unit. Preferably, two layers of polymer is used in the present invention. The first layer of polymer can be used to bind multiple transmission media into a single unit, then the second layer of polymer can be used for embedding water-blocking material after the first layer is cured. Alternatively, a slotted core can be used to hold such transmission media together.

The polymer used to cover the transmission media can be any suitable polymer. Preferably, an acrylate resin can be used as the polymer. For example, UV-Curable Acrylate Coating such as Bufferlite DU-1003, DSM; Cablelite 3287-9-39A, DSM and Cablelite 850-975, DSM can be used as the polymer. However, the polymer used in this step can be varied based on the application, and such variations are intended to be covered within the scope of this step.

In step 1102, the water-blocking material is applied to the outer surface of the uncured polymer. Preferably, a powder form of the water-blocking material is used for preventing water penetration into the optical fibers. The water-blocking material can be applied by using any suitable means. For example, the water-blocking material can be applied by using a spray (such as an air gun) or a die. The water-blocking material is a polymer that can absorb and retain extremely large amounts of liquid relative to its own mass. For example, a suitable water-blocking material is Cabloc C96 water-swellable powder (45 to 150 μm), manufactured by of Evonik Stockhausen GmbH.

Then, in step 1103, the coated transmission media is cured. Any suitable means for curing the polymer may be used. Preferably, an ultraviolet light is used to cure the polymer.

After curing the transmission media in the step 1103, a sheath may be applied around the cured polymer to create an optical fiber cable such as shown in FIG. 10. Or multiple of such cured transmission media can be placed in the common sheath as shown in FIG. 10A. The components of the sheath may vary depending on a number of factors such as type of fibers in the cable, the application of the cable and the environment surrounding the cable at the installation location. For example, a sheath may include one or more plastic jackets, strength members, and metallic shields.

Figure 12:
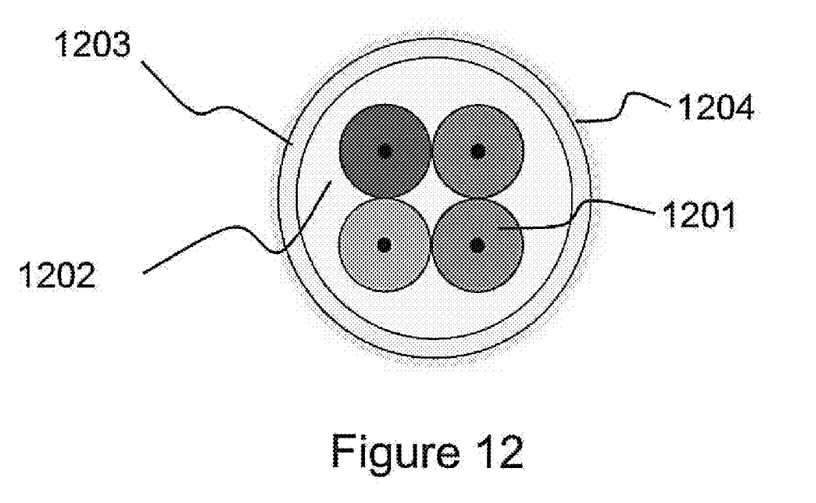
FIG. 12 is a cross-section view of an embodiment of the present invention wherein four optical fibers are used as the transmission media.

The following example describes one of the methods to create one embodiment of the present invention. First, four optical fibers 1201 are delivered from fiber pay-offs and run over an anti-static unit. Then, they are guided into a die assembly comprising an entrance die and an exit die. Between the dies an inner liquid uncured acrylate is applied with pressure to the fibers and fully encapsulates them. An ultra-violet (UV) lamp positioned after the die assembly is used to cure the acrylate material. Then, this unit runs down the line into a die assembly where a first layer 1202 of outer coating material is applied. Another UV lamp is used to cure the first layer 1202. Thereafter, the fiber unit is passed through another die assembly where an outer layer 1203 of acrylate material is applied. Directly after this die assembly, superabsorbent powder 1204 is applied onto the liquid uncured outer layer of acrylate via airguns that blow an air/powder mixture onto it. Thereafter, a UV lamp cures the second outer acrylate layer. Finally, an ink jet printer applies marking information onto the unit and two air coolers are used to cool down the unit before it is wound onto a drum. All materials are applied at room temperature, and although the UV lamps increase the temperature of the unit, it remains below 50° C.

The above described process is merely exemplary. For example, when an eight or twelve fiber unit is constructed, more material has to be applied and more heat is introduced with the UV lamps, which has to be taken out completely before winding. Also, water-blocking material can be applied to the outer surface of the transmission medium in a number of different ways.

A device applying the water blocking material onto the outer surface of the transmission media in step 1102 can be any suitable means to apply the water-blocking material onto the uncured polymer surface. Preferably, the water-blocking material is in a powder form and the device sprays the powder around the uncured polymer surface of the transmission media.

While various embodiments of the present invention have been described above, it should be understood that they have been presented by way of example, and are not intended to limit the present invention. It is understood that the transmission media may comprises a non-optical transmission means such as metallic wire(s). Also, polymer, which covers transmission media, can be in any shape or size. It depends on the end products (e.g. optical fiber cables). It will be apparent to persons skilled in the relevant art that various changes in form and detail may be made therein without departing from the spirit and scope of the invention. Thus, the present invention should not be limited by any of the above-described embodiments, but should be defined in accordance with the following claims and their equivalents.

What is claimed is:

1. A method for embedding powders of superabsorbent material in the outer surface of a transmission media comprising the steps of:

covering the transmission media with an uncured polymer;

spraying the powders of the superabsorbent material onto the outer surface of the polymer; and curing the polymer.

2. The method of claim 1, wherein the transmission media comprises at least one optical fiber.

3. The method of claim 1, wherein the transmission media comprises at least one buffered optical fiber.

4. The method of claim 1, wherein the transmission media comprises at least one fiber ribbon.

5. The method of claim 1, wherein the transmission media is placed into a slotted core.

6. The method of claim 1, further comprising the step of placing multiple of the coated transmission media in a single optical fiber cable.

7. The method of claim 1, wherein the polymer is an acrylate resin.

8. The method of claim 1, wherein the polymer is cured by ultraviolet light.

9. The method of claim 1, further comprising the step of applying a sheath around the polymer after the polymer is cured.

* * * * *